United States Patent
Watters

[19]

[11] Patent Number: 5,897,645
[45] Date of Patent: Apr. 27, 1999

[54] METHOD AND SYSTEM FOR COMPOSING ELECTRONIC DATA INTERCHANGE INFORMATION

[75] Inventor: Richard L. Watters, Palo Alto, Calif.

[73] Assignee: Electronic Data Systems Corporation, Plano, Tex.

[21] Appl. No.: 08/755,441

[22] Filed: Nov. 22, 1996

[51] Int. Cl.[6] ........................................ G06T 5/00

[52] U.S. Cl. ............................................. 707/523

[58] Field of Search ...................... 707/523, 522, 707/524, 516; 395/500, 707, 701, 182.16, 705

[56] References Cited

U.S. PATENT DOCUMENTS

| 5,202,977 | 4/1993 | Pasetes, Jr. et al. | 395/500 |
| 5,367,664 | 11/1994 | Magill | 393/575 |
| 5,486,686 | 1/1996 | Zdybel, Jr. et al. | 235/375 |

*Primary Examiner*—Joseph H. Feild
*Assistant Examiner*—Alford W. Kindred
*Attorney, Agent, or Firm*—L. Joy Griebenow; Baker & Botts L.L.P.

[57] ABSTRACT

A method for composing electronic data is provided. The method includes creating a document map (56) having a common data format. A driver map (58) of processor operating commands is also created for reading the data in a data file (16) having an original data format. The driver map (58) is then used to convert the data file (16) into a new data file (24) having the common data format in accordance with the document map (56).

20 Claims, 3 Drawing Sheets

METHOD AND SYSTEM FOR COMPOSING ELECTRONIC DATA INTERCHANGE INFORMATION

RELATED APPLICATIONS

This application is related to co-pending application "SYSTEM AND METHOD FOR PROCESSING ELECTRONIC DATA INTERCHANGE INFORMATION," Ser. No. 08/646,656, commonly owned and assigned with the present application.

TECHNICAL FIELD OF THE INVENTION

This invention relates in general to the field of data processing, and more particularly, to a system and method for composing electronic data interchange information.

BACKGROUND OF THE INVENTION

Businesses, schools, hospitals, and other organizations often need to exchange electronic data. Nevertheless, the data processing systems at different organizations typically use different data formats, which are developed for specialized purposes. For example, a first data format may include a name record having a 20 character last name field followed by a 15 character first name field, while a second data format may include a name record having an 18 character first name field followed by an 18 character last name field.

A first organization, such as a bank, may program its data processing equipment to use the first data format, while a second organization, such as a printing company, may program its data processing equipment to use the second data format. If the bank transfers its records to the printing company without any intermediate processing, the printing company data processing equipment will read the first 18 characters of the 20 character bank last name field as the first name field. In order for the bank to transfer electronic data to the printing company, a common data format must be chosen by the bank and the printing company. This common format may be the same as the bank's format or the printing company's format, but both organizations must program their data processing systems to read and write data that will be transferred between the two organizations in the common format.

Electronic data interchange (EDI) generally refers to the process of transmitting and receiving data in a predetermined digital format. This process has been standardized by the American National Standards Institute (ANSI). ANSI Standard ASC X.12 Version 3 release 6 is the latest standard promulgated by the ANSI Accredited Standards Committee (ASC) for EDI. Although this standard may constantly change, the standard remains a uniform EDI format for use by organizations involved in EDI.

The ANSI Standard organizes EDI hierarchically into five levels. These are the interchange control structure, the functional group structure, the document type or "transaction set," the "segment," and the "element." Each transaction set may include one or more segments, some of which are required and others which are optional. Likewise, each segment may include one or more required and optional elements.

In essence, the ANSI EDI Standard is a set of general rules for creating and interpreting electronic documents based upon the transaction set, segments, and elements specified in the ANSI Standard. Organizations can then program data processing equipment to recognize the appropriate transaction sets, segments, and elements in EDI information.

Although transaction sets, segments, and elements have been defined in the ANSI EDI Standard, many segments and their associated elements for a particular transaction set are optional. Therefore, two different organizations may have the same transaction set or document, but may also have different segments and elements for that transaction set. Furthermore, the variations in segments in a transaction set may complicate the processing of the data associated with the transaction set. Optional segments and segment variations essentially result in a large number of potential formats for any given EDI transaction set. This situation may complicate the processing of EDI information between two organizations.

The data processing equipment for processing the many data formats must be set up or programmed to handle each new common data format prior to receiving or generating data in the new format. Existing software tools for generating the data processing commands for receiving and composing data in new common data formats are time-consuming to use because they may require frequent referral to the cumbersome ANSI Standard when writing the data processing software. In addition, existing software tools may not be capable of generating data processing commands for receiving and transmitting EDI document formats that deviate from ANSI Standard formats.

Co-pending application "SYSTEM AND METHOD FOR PROCESSING ELECTRONIC DATA INTERCHANGE INFORMATION," Ser. No. 08/646,656, commonly owned and assigned with the present application, presents a method for generating processor operating commands for controlling a processor to receive data in a common data format and to convert that data into a data format of the receiving organization. Nevertheless, a system and method are required for generating data processing commands that cause a processor to compose a data file having a new common data format from a data file having the transmitting organization's original data format.

SUMMARY OF THE INVENTION

Therefore, a need has arisen for an improved system and method for composing EDI information and other electronic information. In particular, a need has arisen for a system and method for composing electronic data interchange information that generates data processing commands that cause a processor to compose a data file having a new common data format from a data file having the original data format of the transmitting organization.

In accordance with the present invention, a system and method for composing EDI information are provided that substantially eliminate or reduce disadvantages and problems associated with previously developed systems and methods for composing EDI information.

One aspect of the present invention provides a method for composing electronic data. The method includes creating a document map having a common data format. A driver map of processor operating commands is also created for reading the data in a data file having an original data format. The driver map is then used to convert the data file into a new data file having the common data format in accordance with the document map.

The present invention provides several technical advantages. One technical advantage of the present invention is that processor operating commands for composing electronic data into a first data format that is compatible with ANSI EDI Standards from a second data format that is not compatible with ANSI EDI Standards may be created without the need to refer to the cumbersome ANSI standard.

Another technical advantage of the present invention is that electronic data may be composed into a format that deviates from ANSI EDI standard formats. This advantage allows business entities to accommodate existing data processing system data formats even when they deviate from the ANSI EDI standard formats.

BRIEF DESCRIPTION OF THE DRAWINGS

For a more complete understanding of the present invention and advantages thereof, reference is now made to the following description taken in conjunction with the accompanying drawings, in which like reference numbers indicate like features and wherein.

DETAILED DESCRIPTION OF THE INVENTION

Figure 1:
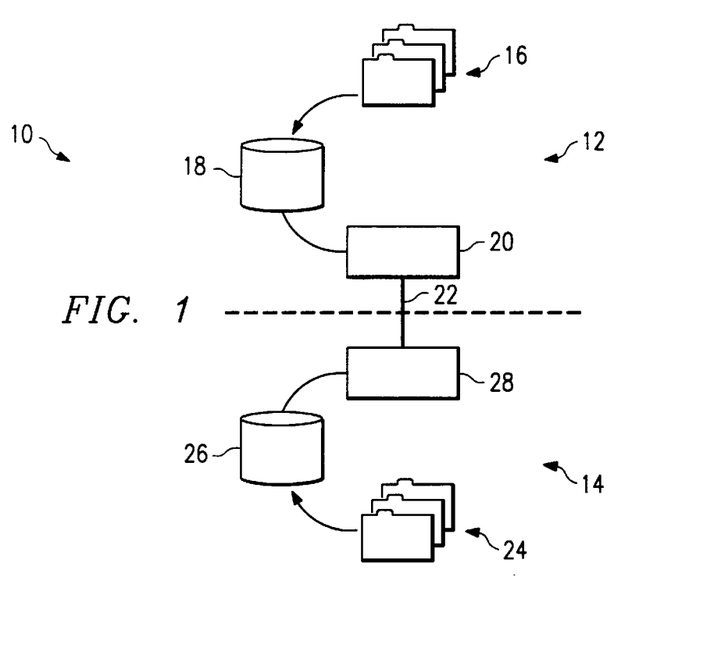
FIG. 1 shows an exemplary business data communications system embodying concepts of the present invention.

FIG. 1 shows an exemplary business data communications system 10 embodying concepts of the present invention. Business data communications system 10 includes first business data system 12 and second business data system 14. First business data system 12 is a business data processing system that may be physically located on the premises of a first business organization, such as a manufacturing facility, warehouse, bank, school, law firm, or other organization. Second business data system 14 is a business data processing system that may be physically located on the premises of a second business organization.

First business data system 12 includes data files 16 having data in a first or original data format stored on a data storage device 18, which is coupled to a data composition system 20. Data composition system 20 is coupled to a data transfer medium 22. Likewise, second business data system 14 includes data files 24 having data in a second data format stored on a data storage device 26, which is coupled to a data conversion system 28. Data conversion system 28 is also coupled to data transfer medium 22. Data transfer medium 22 may be many suitable data transfer mediums, such as a telephone line, a microwave communications channel, a fiber optic conductor, or may include data that is stored in a data file and physically transferred via a tangible data storage device such as a floppy diskette.

In operation, electronic data such as accounts, purchase orders, bills of lading, or other data stored in the original data format in data files 16 of first business data system 12 is identified for transferral to second business data system 14 and subsequent storage in data files 24. The original data format of electronic data in data files 16 is typically not compatible with the second data format of data in data files 24. Data composition system 20 retrieves selected data stored in data files 16 on data storage device 18 and composes the data into a common data format, such as that defined by ANSI Standard ASC X.12. For example, data composition system 20 may comprise data processing equipment, a document map, and a driver map. Data composition system 20 composes data stored in data files 16 by controlling the data processing equipment with commands stored in the driver map, and generates an output file in the common format specified in the document map. This composed, standardized data is then transferred via data transfer medium 22 to data conversion system 28.

Data conversion system 28 converts the composed, standardized data into data in a format that may be used in second business data system 14. The converted data is then stored in data files 24 on data storage device 26. A data conversion system is described in related co-pending application "SYSTEM AND METHOD FOR PROCESSING ELECTRONIC DATA INTERCHANGE INFORMATION," Ser. No. 08/646,656, commonly owned and assigned with the present application. Data composition system 20 and data conversion system 28 may alternately be incorporated in a single data transmission system that both transmits and receives data.

Figure 2:
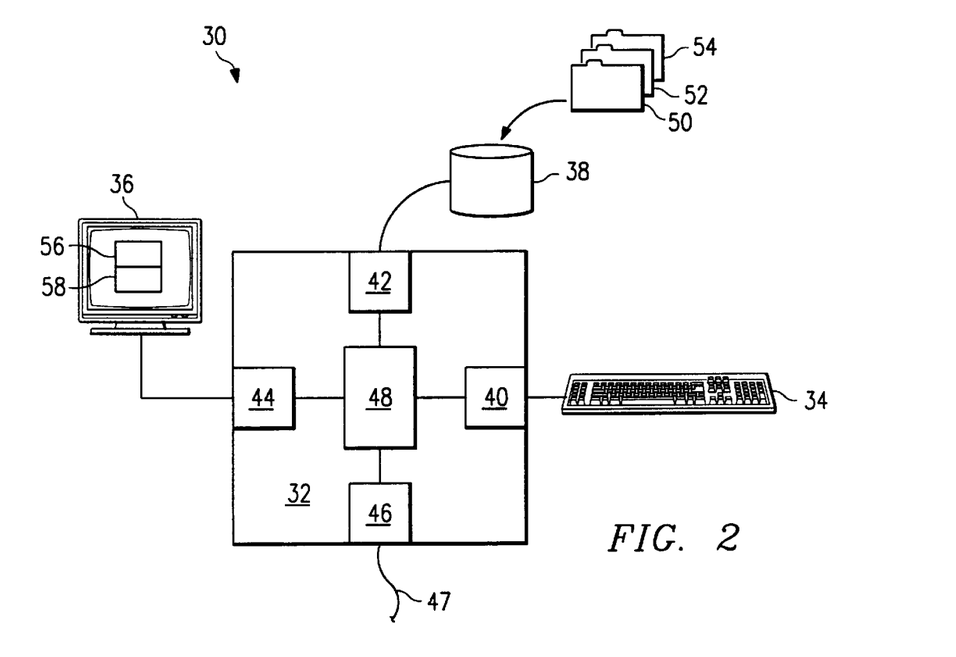
FIG. 2 shows an exemplary electronic data processing system embodying concepts of the present invention.

FIG. 2 shows an exemplary electronic data processing system 30 embodying concepts of the present invention. Electronic data processing system 30 preferably comprises a central processing system 32 that is coupled to a keyboard 34, a display 36, and a data memory 38. In order to interface with the peripheral components described, central processing system 32 uses, respectively, a keyboard interface system 40, a display interface system 44, and a data storage system 42. Central processing system 32 also uses an external communications media interface system 46 to transfer data to and receive data from an external communications medium 47. According to the teachings of the present invention, central processing system 32 also comprises data composition system 48, which performs the functions described in reference to data composition system 20 of FIG. 1.

Central processing system 32 may comprise a suitable data processing system such as, for example, a personal computer that comprises a microprocessor, random access memory (RAM), magnetic storage media, and other typical components. Central processing system 32 may alternately comprise other suitable data processing systems, such as a work station or laptop computer, that are functional to operate and support keyboard interface system 40, data storage system 42, display interface system 44, external communications media interface system 46, and data composition system 48. Central processing system 32 may include one or more microprocessors and various add-on modules such as network interface cards, printer cards, sound cards, and modem cards.

Data composition system 48 is a software application that operates on central processing system 32 and couples to keyboard interface system 40, data storage system 42, display interface system 44, and external communications media interface system 46. Data composition system 48 receives data from keyboard 34 through keyboard interface system 40, and retrieves and stores data stored in an original data format in data files 50, 52, and 54 on data memory 38 through data storage system 42. Data composition system 48 also processes data for transmission to display 36 through display interface system 44. Data composition system 48 composes business data stored in data files 50, 52, and 54 in a first format on data memory 38 into a common format, such as that defined by ANSI Standard ASC X.12. This composed, standardized data is then transferred, preferably in a data file, via external communications media interface system 46 and external communications medium 47 to a data conversion system, such as data conversion system 28 of FIG. 1.

Keyboard 34 couples to keyboard interface system 40, and comprises a data entry device that allows a user to enter data into central processing system 32 through keyboard interface system 40. Keyboard interface system 40 comprises suitable hardware, operating system software, and software applications that operate on central processing system 32. Keyboard interface system 40 couples to data composition system 48 and transmits user-entered data to data composition system 48 and other systems.

Display 36 is a visual interface that is used to present visual images including text and graphics for viewing by a user. Display 36 may comprise a monitor using a cathode ray tube, a liquid crystal display, or other suitable device. Display 36 is coupled to display interface system 44 operating on central processing system 32. Display interface system 44 comprises suitable hardware, operating system software, and software applications that operate on central processing system 32, and supplies image data to display 36 from other systems.

Data memory 38 comprises a data memory device, such as RAM, a magnetic media hard drive, an optical storage device, or other suitable memory devices. Data memory 38 couples to data storage system 42 and stores and retrieves digitally-encoded data in response to operating system commands. Data storage system 42 comprises suitable hardware, operating system software, and software applications that operate on central processing system 32.

External communications media interface system 46 comprises suitable hardware, operating system software, and software applications that operate on central processing system 32, and couples to data composition system 48 and external communications medium 47. External communications media interface system 46 transfers data between data composition system 48 and external communications medium 47.

In operation, data composition system 48 is used to prepare data for transmission from a first business entity to a second business entity. User-entered commands from keyboard 34 cause data composition system 48 to create a document map 56 and a driver map 58. Document map 56 contains a predetermined data format that will allow the data to be transferred between the first business entity and the second business entity. Driver map 58 contains processor operating commands that cause data composition system 48 to process an input data file 50 and to generate an EDI data file 52 in the format specified by document map 56. After document map 56 and driver map 58 have been created, they may be stored in map file 54.

Figure 3:
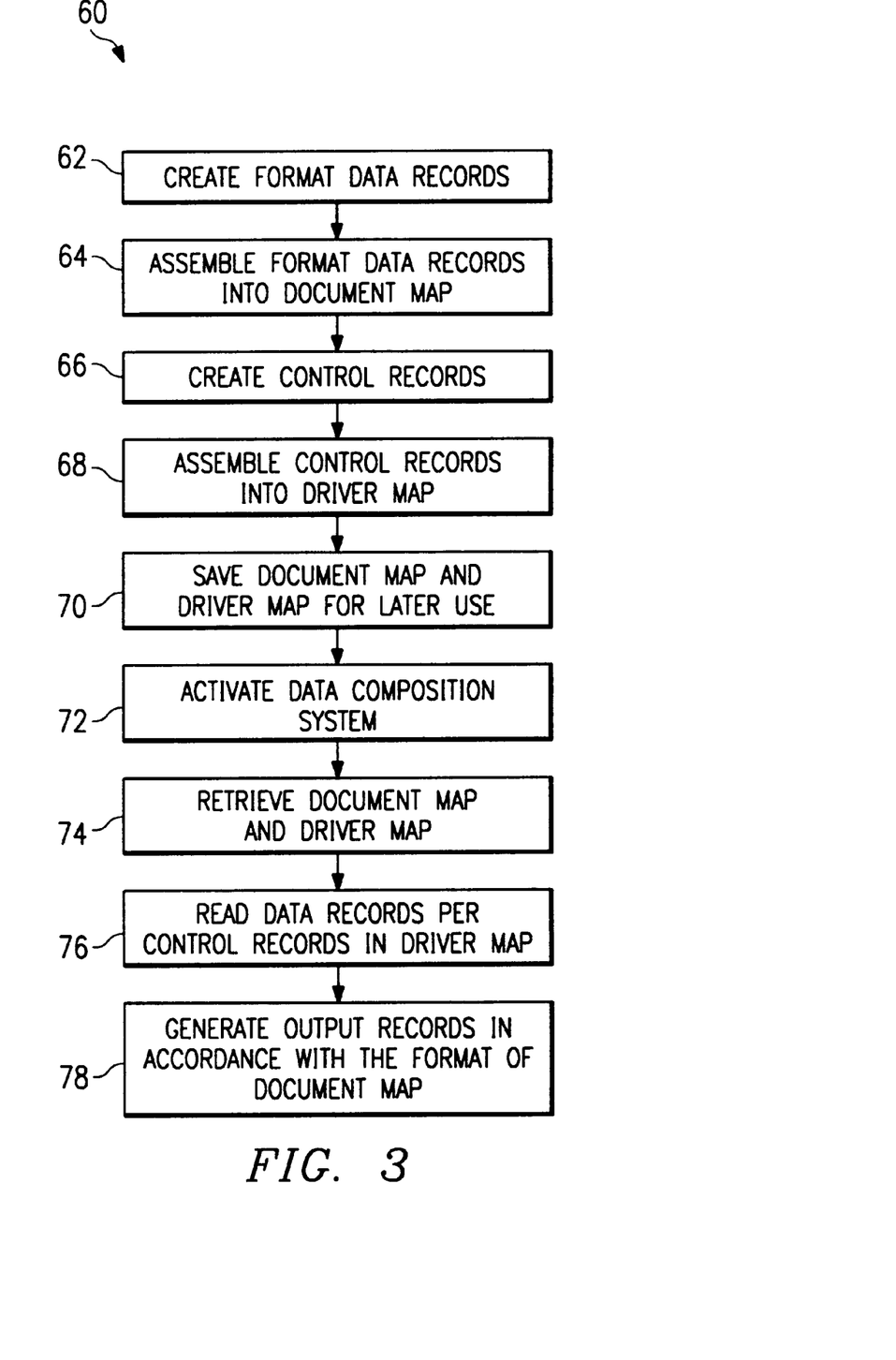
FIG. 3 is a flow chart of an exemplary process for generating and transmitting EDI data files with a data composition system in accordance with teachings of the present invention.

FIG. 3 is a flow chart of a method 60 for generating and transmitting EDI data files with a data composition system similar to data composition system 20 of FIG. 1 or data composition system 48 of FIG. 2, in accordance with teachings of the present invention. At step 62, format data records that define the common data format are created. These format data records are typically created in accordance with ANSI Standard ASC X.12, but may contain additional fields that are not provided for in the ANSI standard. The present invention is capable of processing data in such nonstandard fields, if necessary.

Each format data record may define the format of one or more data fields. In addition, a format data record may define the fields in one or more output records. Format data records may be created by many suitable methods, such as by entering field descriptors and variable identifiers in spreadsheet program cells, in a word processing program data file, or in a graphics or computer aided design program image file.

At step 64, the format records are assembled to form the document map. In general, the document map is a visual analog of the format data records created at step 62. The format data records may be assembled by many suitable methods, and must be compatible with the data composition system. For example, the data composition system may require the format data records to be grouped according to the input data record which contains data for variables in the format data records. Likewise, the data composition system may require the format data records to be grouped according to the output data record that may be generated in the format of the format data records.

At step 66, the control records are created that contain processor operating commands for reading input records, processing the data in the input records, and generating an output file containing the data in the common data format defined by the format data records in the document map. Control records may be created by many suitable methods, such as by entering processor operating commands in spreadsheet program cells, in a word processing program data file, or in a graphics or computer aided design program image file.

At step 68, the control records are assembled to form the driver map. In general, the driver map contains all of the format-specific data processing system commands that are required for reading data from an input data file in an original data format, processing the data, and composing the data into an output data file in the common data format defined by the format data records in the document map. The control records may be assembled by many suitable methods, and must be compatible with the data composition system. For example, the data composition system may require the control records to be grouped according to the input data record fields which are processed by commands in the control records. Likewise, the data composition system may require the control records to be grouped according to the type of processor operating commands contained within the control record.

At step 70, the document map and driver map are stored on a data storage device for later use. Step 70 is performed after all format data records and control records have been created. The data composition system can then process an input file of data in an original data format and generate an output file of data in a common data format without generating a visual display of the document map or driver map.

At step 72, the data composition system is activated, such as by selecting an icon in a windows-based operating environment or entering a command in a disk operating system (DOS) operating environment. The method then proceeds to step 74, where the data composition system retrieves the document map and driver map stored at step 70.

At step 76, the data composition system uses the processor operating commands in the driver record to control the processor to read and process input data. At step 78, the data composition system composes an output file in the common data format in accordance with the processor operating commands in the driver map. For example, a control record in the driver map may include a processor operating command to "WRITE N1," where N1 is a data record having 4 fields. The data composition system processes the control record at step 78 to generate an N1 output record having the common format. Steps 76 and 78 are repeated until all input records have been read, such that the data composition system processes the input data in a single pass.

In operation, the data composition system of the present invention may be used to generate a file of EDI data in a standard or common data format, such as the format specified by ANSI Standard ASC X.12, for transmission between business entities. The present invention further provides for predetermined deviations from standard formats, to facilitate and accommodate the data processing systems of various business entities.

Figure 4:
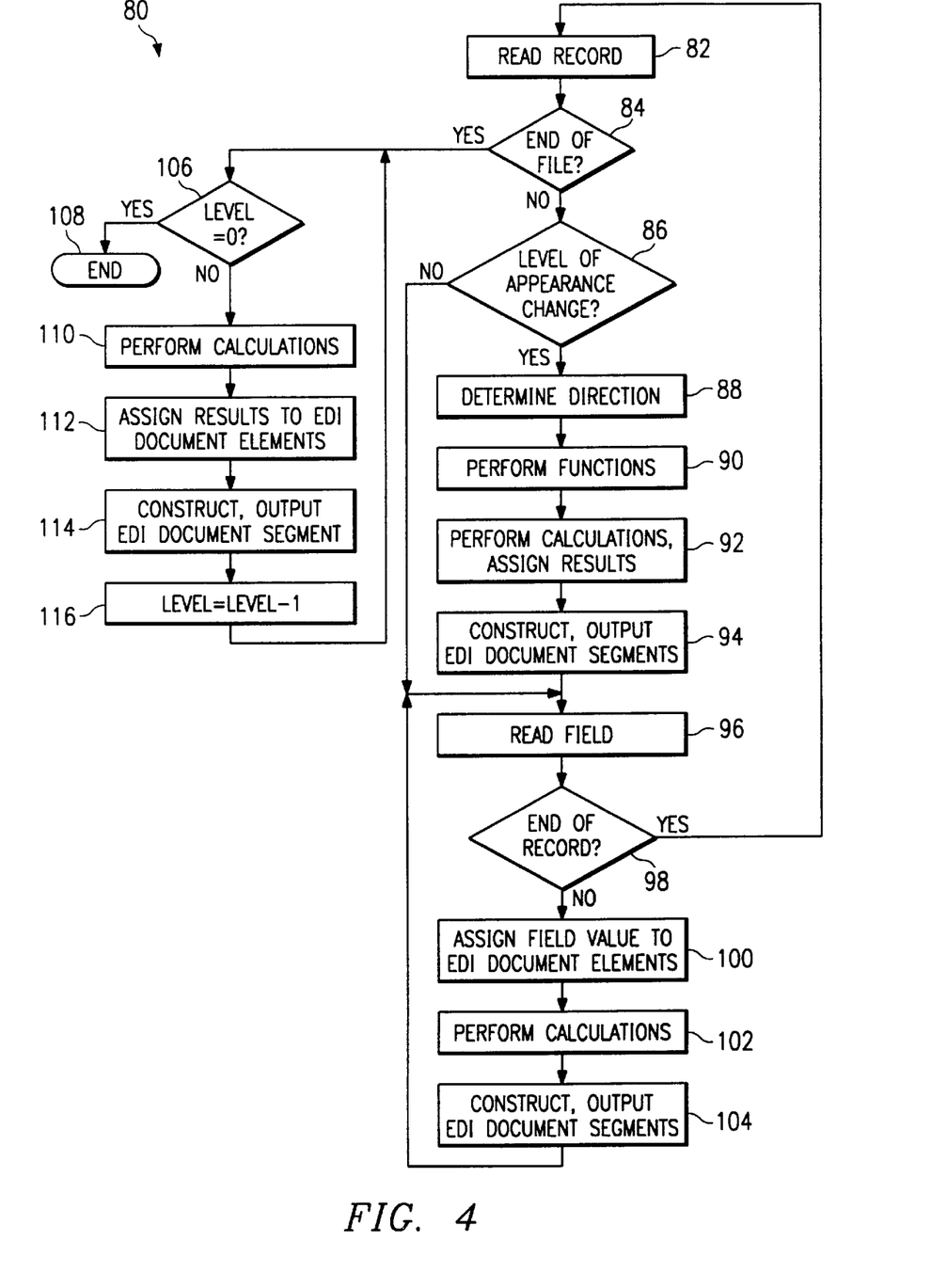
FIG. 4 is a flow chart of an exemplary process for transmission from a data processing system of a first business entity to a data processing system of a second business entity in accordance with teachings of the present invention.

FIG. 4 is a flow chart of an exemplary process 80 for composing data for transmission from a data processing system of a first business entity to a data processing system of a second business entity in accordance with teachings of the present invention. Process 80 may be performed by a data composition system at steps 76 and 78 in method 60 of FIG. 3. Process 80 begins at step 82, where the present input record is read by the data composition system. The input record may contain a predetermined record key that causes the input record to be read by a specific associated control record of the driver map. At step 84, the data composition system determines whether the input record is an end-of-file indicator.

If the end-of-file has not been reached, the method proceeds to step 86, where it is determined whether there has been a change in the level of the input record. The level of the input record refers to a predetermined hierarchical relationship between input records. The level of an input record may be determined by input record type, or may be determined by an assigned field value in the input record. For example, an account identification record may be a level one input record, whereas the list of transactions that occurred in that account during the reporting period would be level two input records. The level one input record must precede the level two input records associated with the level one input record.

When the input record level increases from the level of the preceding record, predetermined control records of the driver map are processed by the data composition system. For example, these control records may contain control fields having processor operating commands that cause the processor to perform certain additional functions and calculations, such as initializing a counter or register.

Furthermore, when the input record level decreases from the level of the preceding record, such as when a new account record is read, other additional functions or calculations may need to be performed, such as writing a record. Thus, if a change in input record level is detected at step 86, the method proceeds to step 88, where the direction of the change is determined. Control records containing control fields having predetermined functions and calculations associated with the change are processed at steps 90 and 92. Control records that cause data composition system to construct and output EDI document segments are processed at step 94.

After all control records associated with an input record level change have been processed at steps 88 through 94, or if no change in level has occurred, the method proceeds to step 96, where the first input record field is processed. Processing of input records is determined by an associated control record. For example, the input record may contain a record key that is used to determine the control record that will be used to process the input record. The associated control record may contain one or more control fields and may have one or more associated control records that are used to process the input record.

At step 98, the input record field is checked to determine if it is an end-of-record indicator. If the end of the record has been reached, the method returns to step 82, where the next input record is read. Otherwise, the method proceeds to step 100.

At step 100, additional control records or control fields are processed if present that cause the input record field value to be assigned to the appropriate predetermined EDI document data records or data fields in the document map. For example, the input record field may be the name of a depositor, having an associated EDI document element of "N1DE01." The control records or control fields would therefore cause the document element N1DE01 to have a value equal to that of the present field. At step 102, control records or control fields that cause any necessary calculations to be performed are processed. At step 104, control records or control fields that cause predetermined EDI document segments to be constructed and output are processed. For example, the control records or fields processed at step 104 may cause all or part of the data record in the document map to be written to the output data file. The field pointer is then moved to the next input record field, and the method returns to step 96.

After the end-of-file indicator is reached at step 84, the method proceeds to step 106, where the level of the previous input record is checked. If the level is zero, the method ends at step 108. Otherwise, the method proceeds to step 110, where control records or control fields stored in the driver map are processed by the data composition system that perform functions associated with proceeding from the current level to the next lower level. At step 112, control records or control fields stored in the driver map are processed that cause calculation results to be assigned to the EDI document elements.

At step 114, control records or control fields stored in the driver map are processed that cause EDI document segments to be constructed and output. The level counter is then decreased by one at step 116, and the method returns to step 106. In this manner, the method "backs out" to terminate at level "0."

In summary, method 80 may be used by a first business entity to process an input file of input records containing business data and to generate an output file of EDI data that may then be transmitted to a second business entity. The process of method 80 is continuous, such that each input record in the input file of business data is only read once in the process of generating the output file of EDI data. Furthermore, no intermediate files are generated by method 80. The process of method 80 may be accomplished by processing a driver map containing control records that create an output file having an EDI standard format, in accordance with format data records in a document map.

While a detailed description of the present invention has been provided, an example of its operation may be beneficial to a further understanding of the present invention and its technical advantages. Accordingly, an example of the present system and method for processing electronic data will be described in discussions relating to Tables 1 through 3.

TABLE 1

| Element | Description | Qualifiers/Definition | Length |
|---------|-------------|----------------------|--------|
| N101 98 | Entity ID Code | "BK" Bank "BW" Borrower "DE" Depositor | 2/2 |
| N102 93 | Name | Name of Entity Above | 1/35 |
| N103 66 | ID Code Qualifier | "94" Assigned by destination organization | 1/2 |
| N104 67 | ID Code | Assigned by Sender | 2/17 |

Table 1 shown above is an example of an excerpt from EDI transaction set specification 821, Financial Information Reporting (Depositor/Borrower Report), used by financial institutions such as banks, as defined by ANSI Standard ASC X.12. The EDI data shown in Table 1 is an example of an EDI "N1" segment from transaction set specification 821, which is defined by the ANSI EDI Standard as a name segment having four elements. Transaction set specification 821 may also contain other segments besides the "N1" segment.

The elements of the N1 name segment as shown in Table 1 and as derived from ANSI EDI Standard ASC X.12 are the Entity ID Code, the Entity Name, the ID Code Qualifier, and the Entity ID Code. The entity ID code, as shown, further contains a "Bank" identifier, which has an ANSI EDI designation as "BK," a "Borrower" identifier, which has an ANSI EDI designation as "BW," and a "Depositor" identifier, which has an ANSI EDI designation of "DE." The ANSI EDI Standard allows the N1 name segment to be used in many different transaction set specifications, and also allows the individual elements of the N1 name segment to be used in other segments. In other transaction set specifications, other ANSI EDI designators may be used instead of "BK," "BW," and "DE." Likewise, some business entities may choose to assign designators that are not specified in the ANSI EDI Standard.

The ANSI EDI Standard format must first be expanded to form a "document map," which is used to define the format of the EDI data that will eventually be transmitted to another business entity. After the document map has been described, the "driver map" will be described. The driver map is used to process data in a predetermined input file format to configure the data in the manner described by the document map.

TABLE 2

| Element | Description | Qualifiers/Definition | Length |
|---|---|---|---|
| N101 98 | Entity ID Code | "BK" Bank "BW" Borrower "TH" Depositor | 2/2 |
| N102 93 | Name | Name of entity above | 1/35 |
| N103 66 | ID Code Qualifier | "94" Assigned by destination organization | 1/2 |
| N104 67 | ID Code | Assigned by sender | 2/17 |
| N1BK01 98 | Bank | "BK" | 2/2 |
| N1BK02 93 | Bank Name | | 1/35 |
| N1BK03 66 | ID Code Qualifier | "94" | 1/2 |
| N1BK04 67 | Bank ID Code | Assigned by Sender | 2/17 |
| N1BW01 98 | Borrower | "BW" | 2/2 |
| N1BW02 93 | Borrower Name | | 1/35 |
| N1BW03 66 | ID Code Qualifier | "94" | 1/2 |
| N1BW04 67 | Borrower ID Code | Assigned by Sender | 2/17 |
| N1DE01 98 | Depositor | "DE" | 2/2 |
| N1DE02 93 | Depositor Name | | 1/35 |
| N1DE03 66 | ID Code Qualifier | "94" | 1/2 |
| N1DE04 67 | Depositor ID Code | Assigned by Sender | 2/17 |

Table 2 is an example of the next step taken to transform the EDI standard format into a document map in accordance with concepts of the present invention. As previously noted, element N101 from Table 1 is shown under the qualifier/ definition column to include a BK identifier, a BW identifier, and a DE identifier. In accordance with ANSI EDI Standard ASC X.12, this signifies that there will be a separate N1 or name segment for each of the BK, BW, and DE identifiers. Table 2 as shown includes these additional identifiers as elements in rows 5–16.

The expansion of Table 1 into Table 2 can be performed without referencing the ANSI EDI Standard because the ANSI EDI Standard has been used in generating the information in Table 1. Thus, a user with knowledge of the ANSI EDI Standard can expand the data in Table 1 to the data in Table 2 without needing to refer to the ANSI EDI Standard. In addition to the data shown in Table 2, other data will also be included in the document map of the visual analog of the EDI data format. This data may include other ANSI-specified fields, or fields that are not specified by ANSI but that may be required by the data processing system of one of the business organizations. As previously noted, the present invention allows such non-standard fields to be processed.

The completed document map contains format data records in each of the rows of the table, and a data field for each format data record in each of the columns of the corresponding row. Each format data record contains a field with an associated element that is either a data variable or a constant alphanumeric value. For example, the format data record for element N1DE03 identifies that it is an ID Code Qualifier having the constant value of "94."

After all elements have been assigned a constant or variable value, the document map may be used to specify the format of the EDI data file that will be output by the data composition program when it processes the driver map. For example, a command in the driver map to "WRITE N1'DE'" would use the information stored in the appropriate fields of the document map to generate data in the output file containing the Depositor identifier "DE," a 35-character alphanumeric variable representing the Depositor Name, the ID Code Qualifier "94," and a 2- to 17-character alphanumeric variable representing the Depositor ID Code.

After the document map has been completed, the driver map is then created by the data composition system in response to user-entered commands. As previously discussed, the driver map is made up of control records having control fields that contain processor operating commands. These processor operating commands cause the processor on which the data composition system is operating to process an input record, change levels, or generate output records, such as by the method shown in FIG. 4. Exemplary control records are shown in Table 3.

TABLE 3

| | | | | | |
|---|---|---|---|---|---|
| $0->1 | Enter File | | [EDATE ISA01] [ETIME ISA10] [SEQ+1 ISA13] [CLEAR, RESET] | | |
| $DRIVER01 | Master Depositor Record | "MD" | Level 1 | 001 | 002 |
| $DRIVER02 | Deposit Detail Record | "DP" | Level 2 | 001 | 002 |
| $DRIVER03 | Master Borrower Record | "MB" | Level 1 | 001 | 002 |
| $DRIVER04 | Loan Detail Record | "LN" | Level 2 | 001 | 002 |
| . | . | | | | |
| . | . | | | | |
| $MD01 | Record Type | | | 001 | 002 |
| $MD02 | Depositor Name | | [STORE N1DE02] | 003 | 037 |

TABLE 3-continued

| | | | | |
|---|---|---|---|---|
| $0->1 | Enter File | [EDATE ISA01]<br>[ETIME ISA10]<br>[SEQ+1 ISA13]<br>[CLEAR, RESET] | | |
| $MD03 | Depositor Customer Code | [STORE N1DE04]<br>[WRITE N1'DE']<br>[INCRM SE01] | 038 | 047 |
| . | | | | |
| . | | | | |
| . | | | | |
| $1->2 | Leave level 1, enter level 2 | [CLEAR N1] | | |
| . | | | | |
| . | | | | |
| $DP01 | Record Type | | 001 | 002 |
| $DP02 | Account Code | [STORE ACT01]<br>[STORE ACT04] | 003 | 012 |
| $DP03 | Deposit Account Name | [STORE ACT02] | 013 | 042 |
| $DP04 | Deposit Balance | [STORE BAL303]<br>[WRITE ACT]<br>[INCRM SE01]<br>[WRITE BAL'3'] | 043 | 060 |

Table 3 is an example of the commands contained in the driver map in accordance with the teachings of the present invention. The first control record of Table 3 initializes the processing of the input records. The first control field of this control record ("$0->1") causes the control record to be processed when moving from level zero, which is the level outside of the data structure, to level one, which is the lowest level of an input record. Thus, when a first input record is read, the control fields of the first control record, shown in column four of Table 3 ([EDATE ISA01]; [ETIME ISA10]; [SEQ+1 ISA13]; [CLEAR, RESET]) are processed by the data composition system. These control fields create a date stamp, a time stamp, a sequence number, and clear and reset registers when processed by the data composition system. Furthermore, if the first input record is at level two or greater, additional level controls may also be processed by the data composition system.

The next set of control records in the driver map file will define the fields to be read in each input record. For example, the "$DRIVER01" control record in row 3 of Table 3 specifies that input records having the record key "MD" (as shown in the third column) should be processed as master depositor records, and that these input records are level 1 records.

The associated master depositor control records are shown in rows 8, 9, and 10 of Table 3. The "$MD01" control record associates the subsequent "$MD" control records with the "$DRIVER01" control record. The "$MD02" control record contains control fields in Table 3 columns 4 through 6 that cause the alphanumeric value of characters 3 through 37 of the input record having the "MD" record key to be stored as the value for variable "N1DE02." The "$MD03" control record contains control fields in columns 4 through 6 that cause the alphanumeric value of characters 38 through 47 of the input record having the "MD" record key to be stored as the value for variable "N1DE04." In addition, the "$MD03" control fields cause the "N1DE" format data record to be written as an output record in the EDI format, and the "SE01" counter to be incremented.

For example, consider a first data record having a value of (second line is for reference only and shows character positions):

```
MDSecond Branch Customer      1234500002
12345678901234567890123456789012345678901234567890
```

This first input record contains the two-character record key field "MD," which causes the input record to be processed according to the commands associated with control records $DRIVER01 and $MD01 through $MD03. The commands shown on lines 8 through 10 of Table 3 cause the depositor name in the second field of the first data record, having 35 characters and ranging from character 3 to character 37, to be stored as variable "N1DE02," as shown on line 14 of Table 2. The depositor customer code, having 10 characters and ranging from character 38 to character 47, is then stored as variable "N1DE04." The WRITE N1'DE' command causes "N1DE01" through "N1DE04" as shown in Table 2 to be output to the EDI data file, in the following EDI compatible format:

N1*DE*Second Branch Customer*94*1234500002á

This output record is in the format specified in ANSI Standard ASC X.12, and contains the information derived from the first data record shown above.

In summary, the present invention allows a user to generate a document map that is a visual analog of an EDI data format, and to generate a driver map that contains the processor operating commands that cause a processor to process input data records and to generate an EDI output data file in accordance with the data format shown in the document map. The document map and the driver map allow a user to transform the input data into any predetermined data format, such as that described by ANSI Standard ASC X.12, without needing to reference the standard. In addition, variations from standard data formats may be easily accommodated with the present invention, thus providing flexibility in processing and generating data formats that do not exactly match standard data formats.

Although the present invention has been described in detail, it should be understood that various changes, substitutions, and alterations can be made hereto without departing from the spirit and scope of the invention as defined by the appended claims.

What is claimed is:

1. A method for composing electronic data, the method comprising the steps of:

creating a document map based on a common data format;

creating a driver map having processor operating commands operable to associate data in a data file having an original data format with data in the common data format; and using the driver map to convert the data file into a new data file having the common data format in accordance with the document map.

2. The method of claim 1 wherein the common data format is an American National Standards Institute Electronic Data Interchange Standard format.

3. The method of claim 1 wherein creating the document map further comprises creating a visual analog of the common data format with one of a spreadsheet program, a word processing program, a graphics program, and a computer aided design program.

4. The method of claim 1 wherein creating the driver map further comprises the step of creating a visual analog of processor operating commands with one of a spreadsheet program, a word processing program, a graphics program, and a computer aided design program.

5. The method of claim 1 wherein creating the document map further comprises the step of generating a visual analog of one or more data records, each data record having one or more data fields, with one of a spreadsheet program, a word processing program, a graphics program, and a computer aided design program.

6. The method of claim 5 further comprising the steps of:
   associating predetermined data fields with alphanumeric constant values; and
   associating predetermined data fields with variable identifiers.

7. The method of claim 6 wherein creating the driver map further comprises the step of generating a visual analog of one or more control records, each control record comprising one or more control fields, with one of the spreadsheet program, the word processing program, the graphics program, and the computer aided design program.

8. The method of claim 7 further comprising the steps of:
   associating a predetermined record key with predetermined control records; and
   associating processor operating commands with predetermined control fields.

9. A method for composing electronic data, the method comprising the steps of:
   creating a plurality of format data records, each format data record having one or more data fields, with one of a spreadsheet program, a word processing program, a graphics program, and a computer aided design program;
   creating a document map by assembling the plurality of format data records in a predetermined order;
   creating a plurality of control records, each control record having one or more control fields containing one or more processor operating commands for reading the data in a first data file having an original data format, processing the data, and outputting the data into a second data file in the common data format of the document map, with one of a spreadsheet program, a word processing program, a graphics program, and a computer aided design program;
   creating a driver map of processor operating commands by assembling the plurality of control records in a predetermined order; and
   saving the document map and the driver map on a data memory for subsequent use.

10. The method of claim 9 further comprising the steps of:
    activating a data composition system;
    retrieving the document map and the driver map from the data memory with the data composition system;
    reading a data file formatted in the original data format with the data composition system according to processor operating commands contained within the driver map; and
    generating an output file with the data composition system according to processor operating commands contained within the driver map, the output file containing data in the common data format specified by the document map.

11. The method of claim 9 wherein the common data format is an American National Standards Institute Electronic Data Interchange Standard format.

12. The method of claim 9 wherein the step of creating a plurality of format data records further comprises the steps of:
    associating predetermined data fields with alphanumeric constant values; and
    associating predetermined data fields with variable identifiers.

13. The method of claim 9 wherein the step of creating a plurality of control records further comprises the step of associating a predetermined record key with predetermined control records.

14. A system for processing electronic data, comprising:
    a central processing system;
    a display coupled to the central processing system;
    a data memory coupled to the central processing system; and
    a data composition system coupled to the central processing system and operable to generate a plurality of format data records and to assemble the plurality of format data records into a document map, to generate a plurality of control records and to assemble the plurality of control records into a driver map, and to save the document map and the driver map on the data memory.

15. The system of claim 14 wherein the format data records of the document map are in an American National Standards Institute Electronic Data Interchange Standard format.

16. The system of claim 14 wherein the data composition system is further operable to retrieve the document map, the driver map, and a data file having an original data format from the data memory, to process the data in the data file according to processor operating commands in the driver map, and to compose an output file for storage on the data memory having data in the common data format of the document map.

17. The system of claim 16 wherein the format data records further comprise one or more data fields.

18. The system of claim 17 wherein each of the one or more data fields further comprises one of a constant alphanumeric value and a data variable operable to receive a value from the data composition system.

19. The system of claim 16 wherein the driver map further comprises one or more control records.

20. The system of claim 19 wherein predetermined control records further comprise an associated record key.

* * * * *